United States Patent

Evans et al.

[11] 4,004,768
[45] Jan. 25, 1977

[54] UNIVERSAL JOINT HANGER FOR TAILPIPES AND THE LIKE

[75] Inventors: Ralph K. Evans, Plantsville; Roy S. Florian, Southington, both of Conn.

[73] Assignee: Nickson Industries, Inc., Plantsville, Conn.

[22] Filed: Aug. 13, 1975

[21] Appl. No.: 604,227

[52] U.S. Cl. .................................... 248/59; 248/60
[51] Int. Cl.² .................. E21F 17/02; F16L 3/00
[58] Field of Search .............. 248/54 R, 58–64; 180/64 A

[56] References Cited

UNITED STATES PATENTS

| | | | |
|---|---|---|---|
| 791,504 | 6/1905 | Rosenfeld | 248/62 |
| 2,744,706 | 5/1956 | Gerdy | 248/60 |
| 2,839,199 | 6/1958 | Peszlen | 248/277 X |
| 3,185,758 | 5/1965 | Litz | 248/62 X |
| 3,261,579 | 7/1966 | Engman et al. | 248/60 |
| 3,289,984 | 12/1966 | Clemons et al. | 248/60 |
| 3,316,605 | 5/1967 | Tabbert | 248/60 X |
| 3,414,262 | 12/1968 | Lounsbury | 248/62 X |

FOREIGN PATENTS OR APPLICATIONS 348,478  5/1931  United Kingdom ............... 248/63

Primary Examiner—Lawrence J. Staab

[57] ABSTRACT

A pipe hanger adapted to support automobile tailpipes and the like comprises a support member with one end portion disposed between and pivotably mounted to end portions of a pair of flexible strap members. The other support member end portion is adapted for mounting the hanger to a support surface such as the auto chassis. A U-shaped bracket straddles and is pivotably mounted to the other end portions of the strap members. Hanger means including an arcuate support portion for a complementarily configured pipe clamp is pivotably mounted to the web of the U-shaped bracket for pivotal movement about an axis perpendicular to the pivotal axes of the bracket and support member with the strap members.

6 Claims, 5 Drawing Figures

UNIVERSAL JOINT HANGER FOR TAILPIPES AND THE LIKE

BACKGROUND OF THE INVENTION

Pipe hangers are widely used for securing mufflers or tailpipes to automobile frames. Exemplary of one basic type of hanger is that of U.S. Pat. No. 3,261,579 granted to M. C. Engman et al on July 19, 1966, wherein a single flexible strap extends between a bracket secured to an automobile frame and a bracket secured to a pipe supported therefrom. The brackets abut end portions of the strap and are secured thereto by rivets or bolts passing through both elements. However, due to an asymmetrical load distribution when a pipe is suspended from the hanger, there is a substantial force tending to snap off the rivet or bolt heads, especially when the system bounces upwardly and falls, snapping the strap taught.

Another type of pipe hanger is that of U.S. Pat. No. 2,744,706 granted to E. J. Gerdy on May 8, 1956. His hanger permits limited angular adjustment, but does not provide universal adjustment as it does not permit any variation in the spacing of a suspended pipe relative to the automobile frame; it appears to require design for a particular automobile model or frame configuration.

Accordingly, it is an object of the present invention to provide a novel pipe hanger which is rugged, economically fabricated, and easily adaptable for use with a wide range of motor vehicles or other support surfaces.

It is also an object to provide such a pipe hanger wherein the force exerted thereon by a suspended pipe extends along the center longitudinal line thereof to minimize the forces acting to shear the pivots.

Another object is to provide such a pipe hanger which is easily adjustable to permit securing pipes at varying distances from and at varying angular orientations relative to a support surface.

SUMMARY OF THE INVENTION

It has now been found that the foregoing and related objects of the present invention are readily attained in a pipe hanger comprising two flexible strap members each having first and second end portions at opposite ends thereof. A support member has a planar engagement portion and a support portion at opposite ends thereof, the engagement portion being disposed between the first end portions of the strap members. The support portion is adapted for mounting the hanger upon a support surface. The first end portions of the strap members are pivoted to the engagement portion of the support member by suitable pivot means to provide pivotal movement therebetween.

Extending along the surface of the second end portions of the strap members are the legs of a U-shaped bracket which has a web extending therebetween. The legs of the bracket are pivotably mounted to the second end portions of the strap members by suitable means. Hanger means adapted to provide pipe support means depend from the bracket web and suitable pivot means pivotably mounts the hanger means to the web adjacent the midpoint thereof whereby the bracket will pivot the hanger means in substantially the same plane as that of the engagement portion of the support member and the pivotal axes of the bracket and support member with the strap members are substantially parallel during pivoting.

In a preferred aspect the support member support portion is elongated with a multiplicity of longitudinally spaced holes therein. The hanger means comprises a hanger member having a base portion and an arcuate support portion spaced therefrom which has a surface concave relative to the hanger member. The hanger member is pivotably mounted to the U-shaped bracket by a fastener extending through aligned apertures in the hanger base portion and bracket web. The arcuate portion provides means for supporting a complementarily configured pipe clamp.

In the preferred embodiment, the support member engagement portion is pivotably mounted to the first end portions of the strap members by a fastener extending through aligned apertures in the engagement portion and strap members. The bracket legs are pivotably mounted to the other end portions of the strap members by a fastener extending through aligned apertures in the legs and strap members.

DETAILED DESCRIPTION OF THE ILLUSTRATED EMBODIMENT

Figure 1:
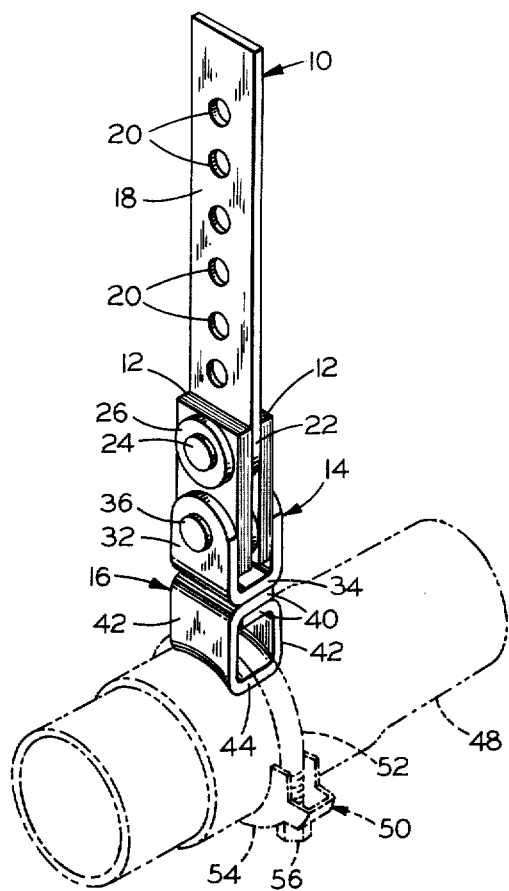
FIG. 1 is a perspective view of a pipe hanger embodying the present invention with a U-shaped pipe clamp and pipe shown in phantom line.

Turning now to the attached drawing in detail, illustrated therein is a pipe hanger embodying the present invention and comprising a support member generally designated by the numeral 10, a pair of parallel flexible shock and sound absorbing strap members 12 each having one end pivotably secured to the support member 10, a U-shaped bracket generally designated by the numeral 14 pivotably secured to the other ends of the strap members 12, and a hanger member generally designated by the numeral 16 pivotably secured to the bracket 14.

Figure 2:
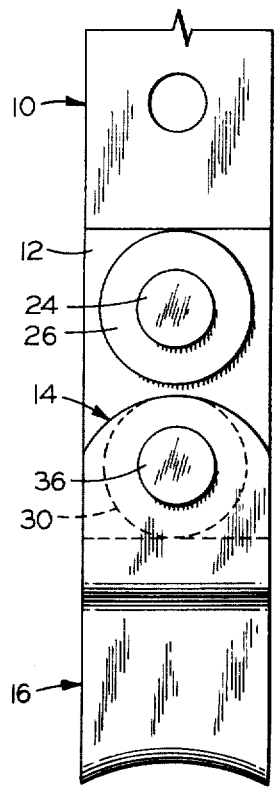
FIG. 2 is a fragmentary front elevational view of the hanger of FIG. 1 drawn to an enlarged scale.
Figure 3:
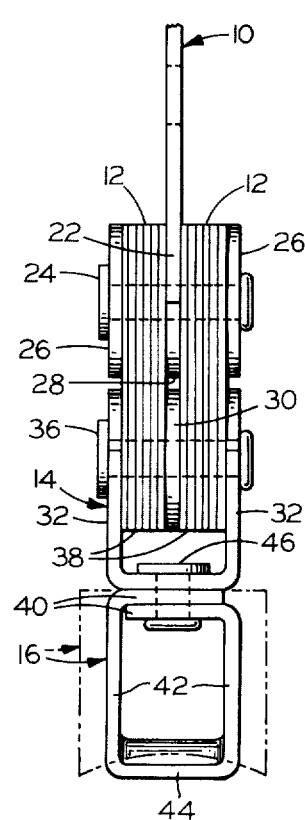
FIG. 3 is a fragmentary side elevational view of the hanger of FIG. 2 with phantom lines showing an alternate position for the lower hanger element.

As seen in FIGS. 1-3, the support member 10 is elongated and has a rectangular cross section. At one end is the support portion 18 which has a multiplicity of longitudinally spaced holes 20 therethrough and at the other end is a planar engagement portion 22. The holes 20 facilitate mounting of the hanger at varying distances from a support surface. The support portion 18 may be manufactured with a specific configuration or it may be bent prior to installation so that it conforms to the configuration of a support surface or satisfies other installation requirements.

The support member engagement portion 22 is disposed between the end portions of the strap members 12 and is pivotably mounted thereto by a rivet 24 which extends through aligned apertures (not shown) in the engagement portion 22 and strap members 12. Washers 26 are disposed between the heads of the rivets 24 and strap members 12. Referring to FIG. 3, the end 28 of the engagement portion 22 is arcuate to provide clearance relative to the spacing washer 30 during relative pivotal movement of the hanger components as described hereinafter.

Pivotably secured to the other end portions of the strap members 12 is the U-shaped bracket 14 which has two spaced parallel legs 32 abutting the outer surface of the strap members 12 disposed therebetween and a web 34 extending between the legs 32. Pivotable mounting is effected by a rivet 36 extending through aligned apertures (not shown) in the legs 32, spacing member 30 and strap members 12, with the spacing washer 30 being disposed between the strap members 12 to maintain them in parallel disposition. The web 34 is spaced from the strap member ends 38 and the free ends of the legs 32 are arcuate to provide clearance during relative pivotal movement of the components.

Pivotably secured to the web 34 of the bracket 14 is the hanger member 16, which comprises two overlapping portions 40, spaced parallel leg portions 42, and an arcuate support portion 44 which has a lower surface concave relative to the bracket 14. Referring to FIG. 3, a rivet 46 extends through aligned apertures (not shown) through the centers of the web 34 and overlapping portions 40 to effect pivotable engagement therebetween.

With reference to FIG. 3, it may be seen that the symmetrical disposition of the hanger component elements about the central longitudinal hanger axis ensures that the forces exerted by a suspended pipe act along a line co-planar with this axis. Thus there are no forces resulting from an off-center line of action that would tend to snap off the rivet heads or weaken the strap members 12. Furthermore, the close spacing of the free ends of the bracket legs 32 and washers 26 prevents the strap members 12 from flexing to an excessive degree and snapping taught as the automobile encounters bumps, a process which would rapidly weaken the strap members 12.

A manner of using the pipe hanger is shown in FIG. 1, wherein a pipe 48 is suspended therefrom by means of a conventional pipe clamp generally designated by the numeral 50. The pipe clamp 50 comprises a U-bolt 52 and a keeper bar 54 extending across the ends thereof. The pipe 48 is supported from the hanger by initially inserting the U-bolt 52 through the aperture defined by the walls of the hanger member 16, placing the pipe 48 within the arms of the U-bolt 52, and mounting the keeper bar 54 over the ends of the U-bolt 52. The pipe 48 is firmly engaged between the clamp 50 and hanger member 16 by tightening the nuts 56 onto the U-bolt 52.

Figure 4:
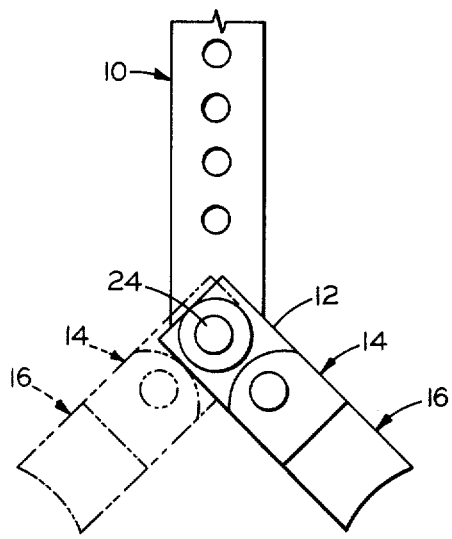
FIG. 4 is a fragmentary front elevational view of the hanger with a portion thereof pivoted and with an alternative pivoted configuration shown in phantom line.
Figure 5:
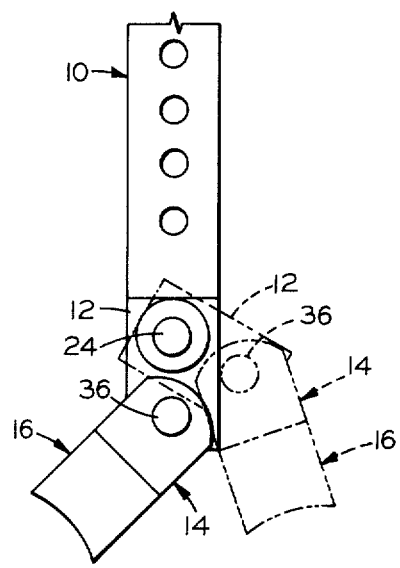
FIG. 5 is a view similar to FIG. 4 with a doubly pivoted configuration shown in phantom line.

The versatility of the pipe hanger is shown in FIGS. 3–5, which illustrate the relative pivotability of the hanger components about three axes coinciding with the longitudinal axes of the rivets 24, 36, 46. With reference to FIG. 3, it can be seen that the hanger member 16 is rotatable 360° relative to the bracket 14 about the axis of the rivet 46. FIGS. 4 and 5 illustrate pivotal movement of the hanger components about parallel axes of the rivets 24, 36, while FIG. 5 in phantom line also shows compound pivotal movement about axes of the rivets 24, 36 simultaneously. This versatility permits adapting the hanger to virtually any installation configuration, whether it requires a specific angular orientation or distance from support surface to pipe. As described hereinbefore, the support member 10 may be configured to facilitate installation to a particular support surface and at any orientation relative thereto.

The strap members 12 are preferably of corded rubber to provide the desired sound and vibration absorption and strength, but may be of any material having comparable properties. Exemplary of strap material is that sold under the trademark TYCOR by A. Lakin and Sons, Inc. The remaining hanger components are preferably of steel or a suitable substitute. Although at least two such members must be used to provide the desired balance, in fact each strap member may be provided by a plurality of separate strap elements cooperating to ensure the desired strength.

The hanger member 16 is preferably formed separately from the pipe clamp, although it may be integral therewith. Rivets are conveniently used to assemble the parts and provide the desired pivoting action, but bolts or other comparable fasteners which permit pivotal movement may be substituted therefor.

Thus, it can be seen that the present invention provides a novel pipe hanger which is rugged, economically fabricated, and easily adaptable for use with a wide range of motor vehicles or other support surfaces. The force exerted on the pipe hanger by a suspended pipe extends along the center longitudinal line of the hanger to minimize the forces acting to shear the pivots. The hanger is easily adjustable to permit securing pipes at varying distances from and at varying angular orientations relative to a support surface.

Having thus described the invention, we claim:

1. A pipe hanger comprising:
   a. a pair of closely spaced strap members each having first and second end portions at opposite ends thereof and extending in parallel planes;
   b. an elongated sheet-like support member having a thickness less than the thickness of either of said strap members, said support members having a planar engagement portion and a support portion at opposite ends thereof, said engagement portion extending in a parallel plane between the planes of said strap members and being disposed between said first end portions of said closely spaced strap members and said support portion being adapted for mounting said hanger upon a support surface;
   c. means pivotably mounting said first end portions of said strap members to said engagement portion of said support member;
   d. a bracket of generally U-shaped configuration having spaced legs extending along and closely adjacent the outer surfaces of said second end portions of said strap members and a web spaced from said second end portions;
   e. means pivotably mounting said legs of said bracket to said second end portions of said strap members, the axis of said second mentioned pivotal mounting means being aligned with and parallel to the axis of said first mentioned pivotal mounting means;
   f. hanger means depending from said bracket web and adapted to provide pipe support means;
   g. means pivotably mounting said hanger means to said bracket web adjacent the midpoint thereof whereby said bracket will pivot said hanger means about an axis lying in substantially the same plane as that of said engagement portion of said support member and said pivotal axes of said bracket mounting means and of said support member with said strap members are substantially parallel during pivoting.

2. The pipe hanger of claim 1 wherein said support member support portion is elongated with a multiplicity of longitudinally spaced holes therein.

3. The pipe hanger of claim 1 wherein said first mentioned mounting means includes an aperture in said support member engagement portion, aligned apertures in said first end portions of said strap members, and a fastener extending through said aligned apertures in said strap members and support member.

4. The pipe hanger of claim 1 wherein said second mentioned mounting means includes aligned apertures in each of said bracket legs and in said second end portions of said strap members, and a fastener extending through said aligned apertures in said legs and strap members.

5. The pipe hanger of claim 1 wherein said hanger means comprises a hanger member having a base support portion adjacent said web of said bracket and an arcuate portion spaced therefrom having a surface concave relative to said hanger member and providing means for supporting a complementarily configured pipe clamp, and wherein said third mentioned mounting means includes aligned apertures in said bracket web and in said hanger member base portion and a fastener extending through said aligned apertures in said web and base portion.

6. The pipe hanger of claim 1 wherein spacer means is provided between the second end portions of said strap members and is of a thickness substantially equal to the thickness of said engagement portion of said support member.

* * * * *

UNITED STATES PATENT AND TRADEMARK OFFICE
CERTIFICATE OF CORRECTION

PATENT NO. : 4,004,768
DATED : January 25, 1977
INVENTOR(S) : Ralph K. Evans and Roy S. Florian It is certified that error appears in the above-identified patent and that said Letters Patent are hereby corrected as shown below:

Column 6, lines 2-3, "support" should be deleted.

Signed and Sealed this

Third Day of May 1977

[SEAL]

Attest:

RUTH C. MASON
*Attesting Officer*

C. MARSHALL DANN
*Commissioner of Patents and Trademarks*